United States Patent [19]

Frohwerk

[11] 4,382,046

[45] May 3, 1983

[54] WATER COOLING TOWER WITH LAYERS OF MULTI-CELL TILES AND SPACERS

[75] Inventor: Paul A. Frohwerk, Granbury, Tex.

[73] Assignee: Ceramic Cooling Tower Company, Fort Worth, Tex.

[21] Appl. No.: 304,695

[22] Filed: Sep. 22, 1981

[51] Int. Cl.³ ............................................. B01F 3/04
[52] U.S. Cl. .............................. 261/94; 261/DIG. 72; 261/DIG. 11
[58] Field of Search ........ 261/DIG. 72, 94, DIG. 11, 261/96, 98; 210/150; 52/604

[56] References Cited

U.S. PATENT DOCUMENTS

| | | | |
|---|---|---|---|
| 650,367 | 5/1900 | Bouchaud | 261/DIG. 72 |
| 888,120 | 5/1908 | Scherfenberg | 261/DIG. 72 |
| 992,286 | 5/1911 | Stiles | 52/303 |
| 1,587,171 | 6/1926 | Morton | 52/302 |
| 2,183,657 | 12/1939 | Page | 261/DIG. 72 |
| 2,787,458 | 4/1957 | Reintjes | 52/604 |
| 2,911,204 | 11/1959 | Malone | 261/DIG. 72 |
| 3,112,261 | 11/1963 | Porter et al. | 210/150 |
| 3,295,281 | 1/1967 | Dixon | 52/604 |
| 3,329,271 | 7/1967 | Ward et al. | 210/150 |
| 3,751,017 | 8/1973 | Lemmens | 261/DIG. 11 |

FOREIGN PATENT DOCUMENTS

| | | | |
|---|---|---|---|
| 3002385 | 9/1980 | Fed. Rep. of Germany | 261/112 |
| 576329 | 3/1946 | United Kingdom | 210/150 |
| 864622 | 4/1961 | United Kingdom | |
| 877975 | 9/1961 | United Kingdom | |

OTHER PUBLICATIONS

"Industrial Wastes," Egan et al., Aug. 1960, vol. 5, No. 4, pp. 71-76, 210-150.

*Primary Examiner*—Tim R. Miles

[57] ABSTRACT

A water cooling tower includes a heat and mass transfer section which is formed from a plurality of layers of multi-cell tiles and spacers between the layers of tiles. Water flows over and downwardly through the cells of the tiles and between adjacent tiles, and air is drawn upwardly through the tower to cool the water.

4 Claims, 10 Drawing Figures

U.S. Patent  May 3, 1983  Sheet 3 of 3  4,382,046

WATER COOLING TOWER WITH LAYERS OF MULTI-CELL TILES AND SPACERS

BACKGROUND

This invention relates to liquid cooling towers, and more particularly, to liquid cooling towers which include a plurality of stacked layers of open-celled tiles.

Cooling towers are used to cool liquid by contact with air. The liquid is allowed to flow downwardly through the tower, and a countercurrent flow of air is drawn through the falling liquid by various means. A common application of liquid cooling towers is for cooling water (dissipating waste heat) used in electrical generating and process plants and industrial and institutional air conditioning systems.

One type of prior art cooling tower utilizes stacked layers of clay tiles. The tiles are formed by extruding clay to form a tube having a generally rectangular cross-section and a plurality of axially extending cells. The extruded tube is transversely severed by cutting wires to form individual tiles having an axial length of about five to eight inches (12.7 to 20.3 cm.). The rectangular tiles may have transverse dimensions of about 9 to 10 inches (22.9 to 25.4 cm.) and two to five cells on each side. Thereafter the tiles are hardburned to form a hard, structural tile. The tiles are stacked in layers so that the cells of the tiles extend vertically. The tiles of each layer are stacked directly on the tiles of the previous layer, and the tiles of each layer are preferably offset so that the cells of one tile are not vertically aligned with the cells of the tiles above and below. The tiles within each layer are spaced laterally from adjacent tiles of the same layer.

The tiles are stacked within a confining wall, and the water or other liquid to be cooled is introduced to the top of the stack by, for example, spray nozzles. The water flows downwardly over the walls and through the cells of the tiles and through the spaces between adjacent tiles of the same layer. Air flow is induced upwardly through the stack countercurrently to the water. The air helps to break the water into droplets, and the contact between the air and the water results in heat and mass transfer from the water to the air.

SUMMARY OF THE INVENTION

I have found that the efficiency of such a cooling tower can be significantly increased by inserting spacers between adjacent layers of tiles rather than stacking each layer directly on the previous layer. These spacers create a vertical space of from 1 to 4 inches (2.5 to 10.2 cm.) between the layers of tile, and air and water can therefore flow transversely to some extent between adjacent layers. The pressure drop or the resistance of air flow through the stack is thereby reduced. The use of layers of spacers also results in better heat and mass transfer between the water and the liquid. The spaced layers therefore enable the required air to be induced with less energy while increasing the transfer efficiency of the cooling tower or enable the size of the cooling tower to be decreased without decreasing the cooling capacity.

DESCRIPTION OF THE DRAWING

The invention will be explained in conjunction with specific embodiments illustrated in the accompanying drawing, in which.

DESCRIPTION OF SPECIFIC EMBODIMENTS

Figures 1, 2, 3:
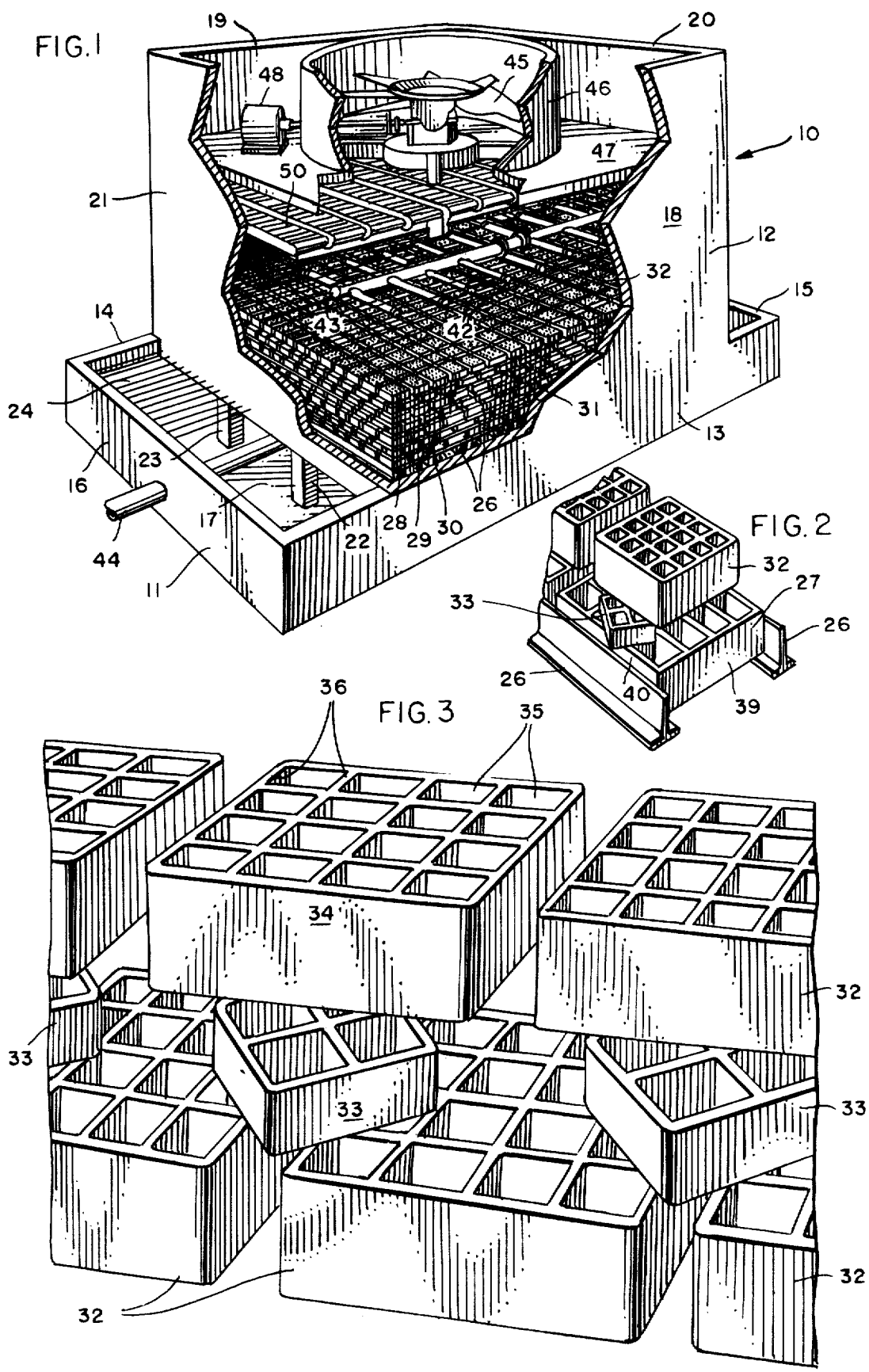
FIG. 1 is a fragmentary perspective view of a cooling tower which utilizes spacers between layers of tiles in accordance with the invention.
FIG. 2 is an enlarged fragmentary perspective view of the two bottom layers of tiles.
FIG. 3 is an enlarged fragmentary perspective view of a pair of layers of tiles separated by a layer of spacers.

The invention will be explained in conjunction with a water cooling tower assembly 10 illustrated in FIG. 1 which is a mechanical draft type of tower used for cooling water for an air conditioning system. It will be understood, however, that the invention can be used in other types of cooling towers, for example, natural draft, chimney-type towers which are used in electrical generating plants.

The cooling tower assembly includes a basin 11 and a wall 12 which extends upwardly from the basin. The particular basin illustrated is rectangular and includes side walls 13, 14, 15, and 16 and a bottom wall 17. The wall 12 is also rectangular and includes sides 18 and 19, which are extensions of the basin walls 13 and 14, and sides 20 and 21, which are spaced inwardly from the basin sides 15 and 16. The tower walls 20 and 21 terminate above the bottom of the basin and are supported by support posts 22 and 23. Air grates 24 cover the space between the basin side wall 15 and the tower side wall 20 and between the basin side wall 16 and the tower side wall 21. The grate is broken away in FIG. 1 for clarity of illustration.

Although the particular basin and tower wall illustrated are rectangular, it will be understood that either the basin or the tower wall can be circular, polygonal, or any other desired shape.

A plurality of parallel cast iron support lintels 26 (see also FIG. 2) extend between the basin side walls 13 and 14 and are supported by beams which extend between tower walls 20 and 21. Each lintel has an inverted T shape and supports a row of bottom tiles 27 (FIG. 2). The row of bottom tiles forms a first horizontal layer 28 of tiles, and succeeding horizontal layers 29, 30, 31, etc. of tiles 32 are vertically stacked above the bottom layer. Each layer of tiles is spaced from the layer below by a layer of spacers 33 (FIG. 3).

Figure 4:
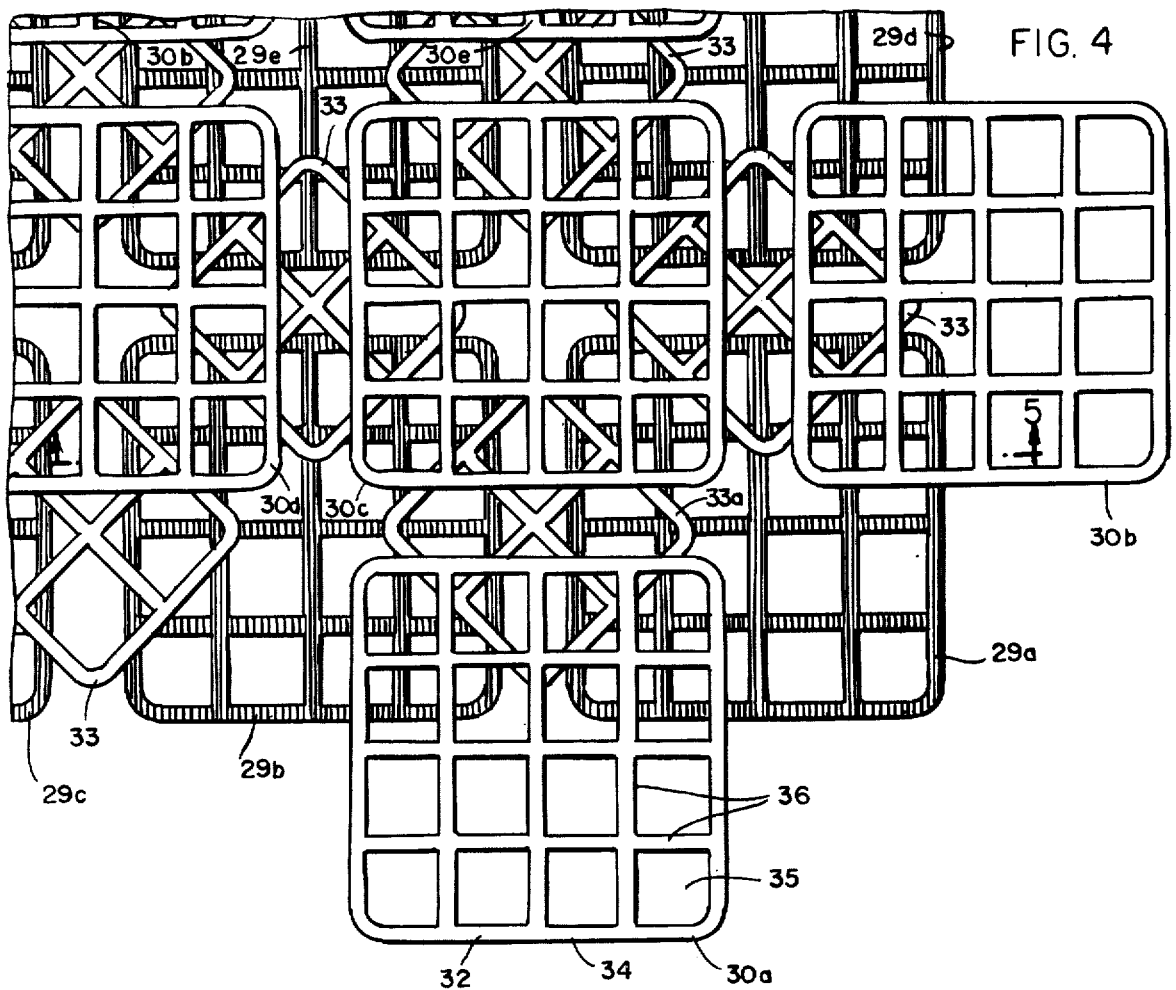
FIG. 4 is a fragmentary plan view of a pair of layers of tiles separated by a layer of spacers.
Figure 5A:
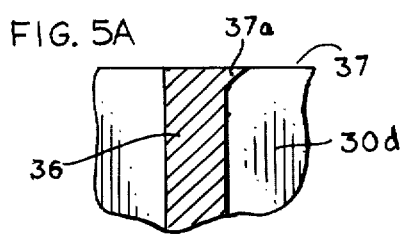
FIG. 5A is an enlarged fragmentary view of a portion of FIG. 5.

Referring to FIGS. 3 and 4, each of the tiles 32 is generally rectangular in horizontal cross section and includes a rectangular side wall 34 and vertically extending cells or open spaces 35 which are defined by laterally extending, criss-crossing webs or partitions 36. The tiles are preferably formed as previously described by transversely cutting an extruded rectangular tube of clay. The clay is extruded to form the cells 35, and the distance between the cuttors determines the vertical or axial height of the tiles. The cutting operation forms top and bottom edges 37 and 38 (FIG. 5) which are usually rough or burred as a result of moving the cutter through the soft clay. One of the burs is shown at 37a in FIG. 5A. After cutting, the tiles are hardburned to form a hard material having low water absorbence.

Referring to FIG. 2, the tiles in the bottom layer 28 which are supported by the lintels 26 are rectangular rather than square and include long side walls 39 and short side walls 40. The bottom tiles include four cells along the long side and three cells along the short side.

A plurality of water distribution pipes 42 above the top layer of tiles extend outwardly from a header pipe 43. The header pipe is connected to a water supply pipe 44 which extends downwardly through the stack of tiles and outwardly through the basin side wall 16. The water supply pipe is connected to the source of water which is to be cooled. The water distribution pipes are provided with spray nozzles or orifices for distributing the water over the top of the stack of tiles.

In the mechanical draft tower illustrated, an air fan 45 is supported in a cylindrical fan stack 48 above the water distribution pipes. The fan stack extends upwardly from a top wall 47 which encloses the top of the tower. The fan is driven by a motor 48 which is mounted on the top wall. Natural draft towers do not include a fan, and air movement is induced through a chimney effect rather than by mechanical equipment.

Drift eliminator assembly 50 is positioned between the fan 45 and the water distribution pipes 42. The drift eliminator assembly is intended to permit air to flow upwardly therethrough but to impede the passage of water. The particular drift eliminator shown in the drawing uses three layers of angled slots to form a zigzag path, and another drift eliminator which has been used in such towers includes a plurality of spaced-apart air-foil shaped vanes.

Except for the spacers 33 which separate the layers of tiles, the foregoing structure is representative of prior art cooling towers sold by Ceramic Cooling Tower Company of Fort Worth, Tex. In such prior art cooling towers the first layer 29 of tiles 32 would be stacked directly on the bottom layer 28 of the rectangular tiles 27, and each succeeding layer of tiles would be stacked directly on the previous layer.

I have found that the efficiency of such a cooling tower is substantially increased if each layer of tiles is separated from the adjacent layers by spacers. The spacers reduce the pressure drop of the air which is drawn through the stack of tiles by the fan 45 and increase the heat and mass transfer rate between the water and the air. The combination of increased transfer and reduced pressure drop permits energy and equipment savings by reducing the horse power of the fan motor and/or the pumping head required to circulate the liquid to be cooled. In one specific embodiment of the invention a cooling tower with spacers between each layer of tiles used 46% of the horse power required by the same size tower without spacers. In another embodiment of the invention the cooling capacity of a tower without spacers was achieved in a tower with spacers that was only about 77% of the size of the tower without spacers. The same horse power fan was used in both towers. The reduced size permits substantial savings in the cost of the tile.

The particular embodiment of spacers 33 illustrated in FIGS. 3-6 is formed from extruded clay which is hardburned in the same way as the tiles 32. However, the spacers have only four cells 52 (FIG. 6) which are formed by X-shaped webs or partitions 53 and 54, and the spacers have only about ¼ of the cross sectional area of the tiles 32.

Figure 5:
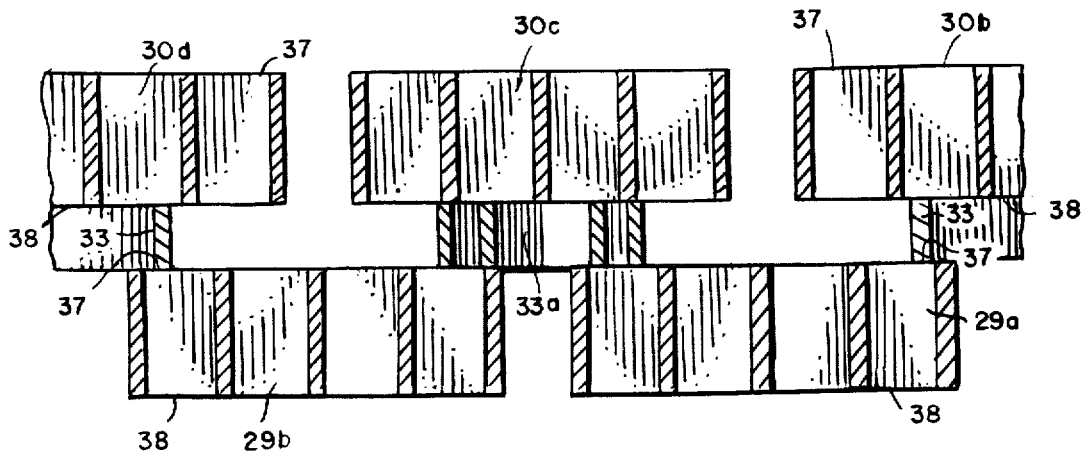
FIG. 5 is a fragmentary elevational sectional view taken along the line 5—5 of FIG. 4.
Figure 6:
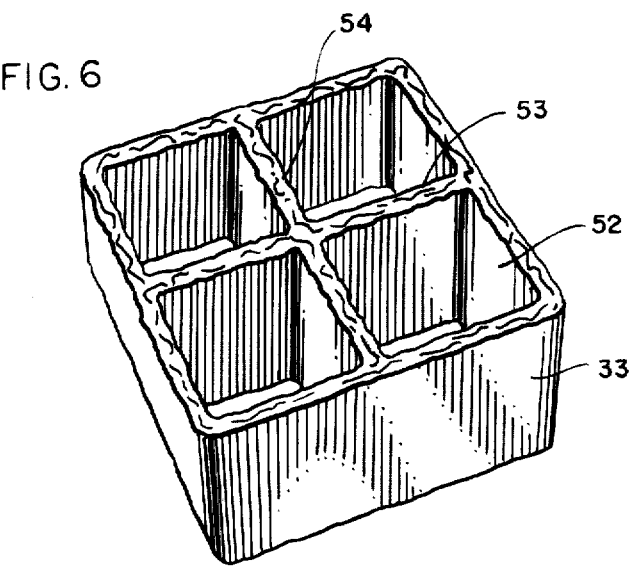
FIG. 6 is a perspective view of one of the spacers.

The stacking pattern of the tiles and spacers is illustrated in FIGS. 4 and 5. The tiles of the layer 29 are indicated by the reference numerals 29a, 29b, 29c, etc., and the tiles of the layer 30 are indicated as 30a, 30b, 30c, etc. The tiles of each layer are arranged with their sides parallel to adjacent tiles, and each tile is separated from each adjacent tile by a space approximately as wide as the cells 35 of the tiles to achieve a web-over-cell arrangement of the layers.

Each of the spacers 33 is stacked approximately on the centerlines of two adjacent tiles of the layer 29, and the spacers are arranged so that the X-shaped partitions 53 and 54 extend at about 45° with respect to the side walls of the tiles. The center of each spacer is located above the middle of the space between the two tiles in each direction.

The tiles 30a, 30b, etc. of the next layer 30 of tiles are stacked on the spacers so that the tiles of the layer 30 are offset diagonally with respect to the tiles of the layer 29 in a web-over-cell pattern.

The stacking arrangement illustrated in FIGS. 4 and 5 is continued until the height of the stack provides the desired amount of cooling. A layer of spacers 33 is stacked on the layer 30 of tiles, another layer of tiles is stacked on the spacers, etc. It will be appreciated that the tiles of the layer above the layer 30 will be superposed above the tiles of the layer 29.

Referring to FIG. 5, the lower edges of the tiles of the layer 30 are spaced above the upper edges of the tiles of the layer 29 by the spacers 33 in a web-over-cell configuration. This spacing permits air to flow laterally between the tiles and seek the path of least resistance through the next layer of tiles. The lateral movement of air also enables the air to contact water droplets which form on the lower edges of the tiles, thereby increasing the air-water contact. Redistribution of air and water in the vertical spaces created by the spacers allows maximum transfer potential (enthalpy difference) to be realized in each tile layer.

The precise reasons for the increased efficiency provided by the spacers are not completely understood. One of the reasons may be that the spacers interrupt air flow "chimneys" that otherwise occur in the spaces between adjacent tiles in the same layer. Referring to FIG. 4, the spacer 33a is located in the space between tiles 29a and 29b. If the spacers were not so positioned, a corresponding vertical space would extend through the entire tower. The air which passed upwardly through these vertical chimneys would have very poor air-water contact and would provide poor heat and mass transfer. The spacers break up these chimneys and force the air to flow laterally so that the air flows through the tiles and contacts more water.

The spacers also relieve restrictions to air flow through the cells of the tile. Without the spacers, the criss-crossing partitions of one tile would be centered directly over the cells of the next lower tile. The spacers move these partitions away from the tops of the cells.

It is believed that the increased efficiency caused by the spacers also has something to do with the rough or burred edges of the tiles which are caused by cutting the extruded tiles while the clay is still soft. The burred upper and lower edges 37 and 38 of the tiles are perhaps somewhat exaggerated in FIG. 5A for purposes of illustration. It is believed that these burred edges increased the turbulence of the air flow through the prior art cooling towers in which each layer of tiles was stacked directly on the previous layer, thereby causing an increase in the pressure drop of the air. Although the turbulence increases the pressure drop, it is believed that the turbulence helps to break up the water into droplets, which would increase the air-water contact.

The spacers 33 separate the burred edges, thereby facilitating lateral movement of air between the cells of two adjacent layers. Resultant air-water redistribution between tile layers causes improved contact conditions in a manner that increases heat and mass transfer. However, even though the turbulence and pressure drop are reduced, the air-water contact is increased. This is one of the surprising features of the invention—the spacers both reduce the pressure drop and increase the heat and mass transfer between the water and the air. It would be expected that a reduction in pressure drop would decrease the transfer rate because the air would not have as much contact with the water. Conversely, increasing the transfer rate generally increases the pressure drop.

In one embodiment of the invention the tiles 32 had horizontal dimensions of 10×10 inches (25.4×25.4 cm.) and a vertical height of 6 inches (15.2 cm.). The spacers 33 had horizontal dimensions of 6×6 inches (15.2×15.2 cm.) and a vertical height of 2¼ inches (5.7 cm.). The combination of 6 inch high tiles and 2¼ inch high spacers seems to provide the optimum operating characteristics. However, the height of the tiles can vary between about 5 to 8 inches (12.7 to 20 cm.), and the height of the spacers can vary between about 1 to 4 inches (2.5 to 10.2 cm.). The optimum spacer height apparently depends on the height of the tiles. For example, for the 7½ inch (19 cm.) high tile, a 1½ inch (3.8 cm.) high spacer seems to work best. If the spacer is too high it might not be stable enough to support the stack of tiles above it and might be too unwieldy to place in the tower efficiently. The height of the spacers is preferably less than ½ of the height of the tiles.

The spacers 33 have 4 cells compared to 16 cells in the tiles, and the cross sectional area of the spacers is about ⅓ the area of the tiles. The area of the spacers should be less than the area of the tiles and preferably is less than ½ of the area of the tiles.

Figure 7:
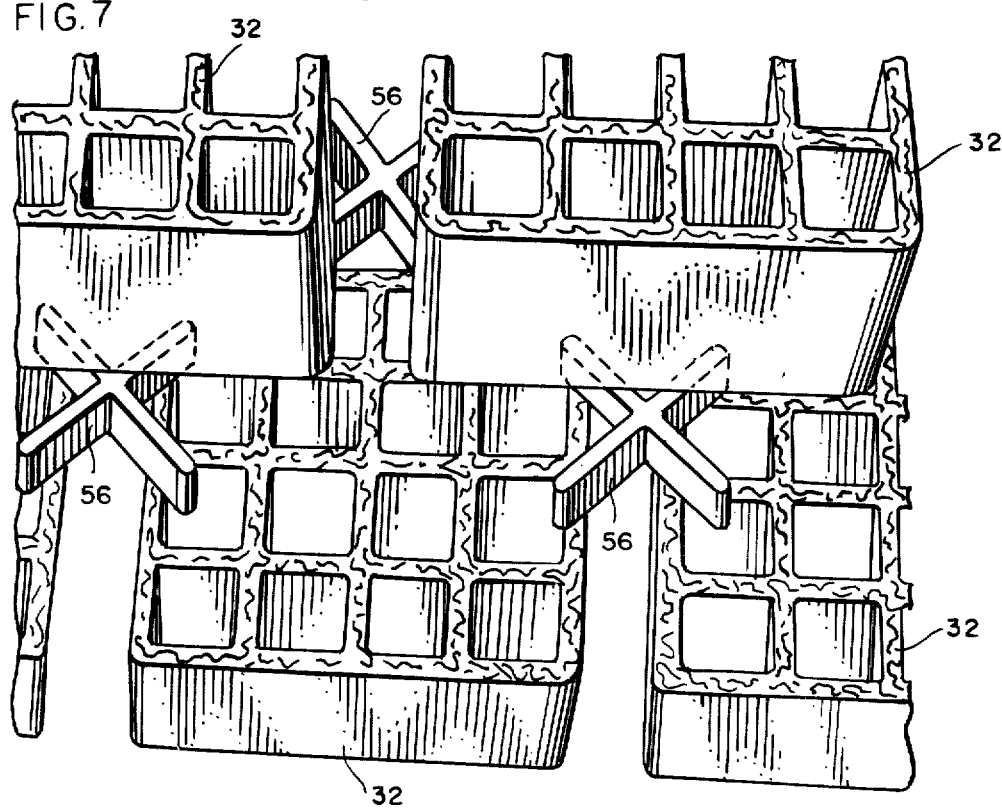
FIG. 7 is a view similar to FIG. 3 showing an alternate embodiment of the spacer.
Figure 8:
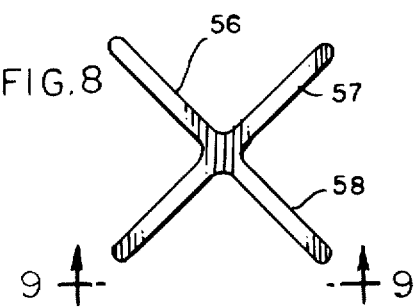
FIG. 8 is a top plan view of the spacer of FIG. 7.
Figure 9:
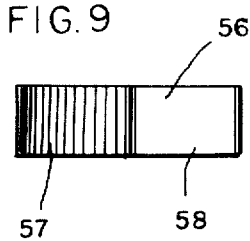
FIG. 9 is an elevational view of the spacer taken along the line 9—9 of FIG. 8.

An alternate form of spacer is shown in FIGS. 7-9. The spacer 56 is X-shaped in horizontal cross section (FIG. 8) and is formed by a pair of intersecting walls 57 and 58. The X-shaped spacer is made of plastic or metal, for example, cast iron, aluminum, stainless steel, or the like. A metal X-shaped spacer has sufficient strength to support the stack of tiles and does not need the rectangular outer wall of the clay spacers 33 (see FIG. 6). I have found that an X-shaped clay spacer does not have sufficient handling strength without the rectangular outer wall.

The X-shaped spacer 56 has generally the same dimensions as the X-shaped partitions 53 and 54 of the clay spacers 33 and is used in the same way. FIG. 7 illustrates a layer of spacers 56 separating a pair of adjacent layers of clay tiles 32.

The maximum advantages of the spacers are realized when the spacers are used between every pair of adjacent layers of tile. However, improved efficiency can still be obtained when the spacers are used between less than all of the layers. For example, the spacers could be used between every other pair of adjacent layers of tiles.

Although the specific type of tower described is a mechanical draft tower, the invention may also be used in natural draft chimney-type towers.

While in the foregoing specification a detailed description of specific embodiments of the invention was set forth for the purpose of illustration, it will be understood that many of the details hereingiven can be varied without departing from the spirit and scope of the invention.

I claim:

1. In a liquid cooling tower having a plurality of vertically stacked layers of rectangular clay tiles, each of the tiles having a plurality of open cells extending vertically therethrough, each tile of each layer being offset from the tiles of the adjacent layers above and below the tile, and liquid supply means above the stacked layers of tiles for supplying liquid to be cooled to the stacked tiles whereby the liquid flows downwardly through the cells in the tiles and between adjacent tiles of a layer, the improvement comprising a layer of spacers between at least some adjacent layers of tiles for providing a vertical space between adjacent layers of tiles, said spacers having a horizontal cross sectional area less than the horizontal cross sectional area of said tiles, each of said spacers being generally rectangular and being formed from extruded clay and having a plurality of open cells extending vertically therethrough, the rectangular spacers being arranged at an angle of about 45° with respect to the rectangular tiles.

2. The structure of claim 1 in which the horizontal area of each spacer is less than one half of the horizontal area of each tiles, the height of each tile being about 5 to 8 inches and the height of each spacer being about 1 to 4 inches.

3. In a liquid cooling tower having a plurality of vertically stacked layers of rectangular clay tiles, each of the tiles having a plurality of open cells extending vertically therethrough, each tile of each layer being offset from the tiles of the adjacent layers above and below the tile, and liquid supply means above the stacked layers of tiles for supplying liquid to be cooled to the stacked tiles whereby the liquid flows downwardly through the cells in the tiles and between adjacent tiles of a layer, the improvement comprising a layer of spacers between each pair of adjacent layers of tiles for providing a vertical space between adjacent layers of tiles, said spacers having a horizontal cross sectional area less than the horizontal cross sectional area of said tiles, each of said spacers being generally rectangular ang being formed from extruded clay and having a plurality of open cells extending vertically therethrough, the rectangular spacers being arranged at an angle of about 45° with respect to the rectangular tiles.

4. The structure of claim 3 in which the horizontal area of each spacer is less than one half of the horizontal area of each tile, the height of each tile being about 5 to 8 inches and the height of each spacer being about 1 to 4 inches.

* * * * *